US006476962B1

(12) United States Patent
Harrigan

(10) Patent No.: US 6,476,962 B1
(45) Date of Patent: Nov. 5, 2002

(54) MULTI-BEAM ZOOM LENS FOR PRODUCING VARIABLE SPOT SIZES FOR A LASER PRINTER

(75) Inventor: Michael E. Harrigan, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 2 days.

(21) Appl. No.: 09/841,356

(22) Filed: Apr. 24, 2001

(51) Int. Cl.[7] .................................... G02B 15/14

(52) U.S. Cl. ..................... 359/354; 359/355; 359/356; 359/676; 359/663

(58) Field of Search .......................... 359/354, 355, 359/356, 357, 350, 676, 663, 666, 672, 684

(56) References Cited

U.S. PATENT DOCUMENTS

| | | | | |
|---|---|---|---|---|
| 4,353,617 A | | 10/1982 | Tokumitsu et al. | |
| 4,390,235 A | | 6/1983 | Minoura | |
| 4,617,578 A | | 10/1986 | Nezu et al. | |
| 4,623,226 A | * | 11/1986 | Fujii | 359/690 |
| 4,867,545 A | | 9/1989 | Wakimoto et al. | |
| 5,134,523 A | | 7/1992 | Cobb | |
| 5,258,777 A | | 11/1993 | DeJager et al. | |
| 5,414,561 A | | 5/1995 | Wakimoto et al. | |
| 5,675,439 A | * | 10/1997 | Nakatsuji | 359/684 |
| 5,708,532 A | | 1/1998 | Wartmann | |
| 5,783,798 A | | 7/1998 | Abraham | |
| 5,805,347 A | | 9/1998 | Mizutani et al. | |
| 5,959,654 A | | 9/1999 | Yoshida | |
| 5,991,090 A | * | 11/1999 | Strahle | 359/376 |

* cited by examiner

*Primary Examiner*—Mohammad Sikder
(74) *Attorney, Agent, or Firm*—Nelson Adrian Blish

(57) ABSTRACT

A multi-beam zoom lens for producing variable spot sizes on a photosensitive medium from a plurality of individually modulated light sources wherein each light source emits a light beam parallel to each of the other light sources and parallel to an optical axis and wherein a numerical aperture of each of said light beams is greater than 0.125, comprising an afocal zoom lens (10). The afocal zoom lens comprises a first moving group of lenses (13), a second group of moving lenses (14), and a third group of moving lenses (15). A constant barrel length of the afocal zoom lens is less than 160 mm and the zoom lens has a constant distance from the light sources to the photosensitive medium of less than 180 mm. The zoom lens has an afocal magnification of at least 45% across a zoom range.

17 Claims, 10 Drawing Sheets

MULTI-BEAM ZOOM LENS FOR PRODUCING VARIABLE SPOT SIZES FOR A LASER PRINTER

FIELD OF THE INVENTION

This invention relates to digital printers in general and in particular high resolution, color proofing laser printers with zoom lenses using multiple light beams in which the writing spot sizes and pitch can be varied.

BACKGROUND OF THE INVENTION

Digital printing apparatus for color proofing have very high pixel densities, typically 2000 to 4000 spots per inch. Such high pixel densities require small pixels in the range of 1 to 30 microns in diameter and this in turn requires a print lens of high numerical aperture. (The term print lens here refers to the lens which focuses light to form individual pixels on a photosensitive medium.) It is desirable to have the capability to adjust the writing spot size and pitch of this type of system due to several widely used spot densities of 2400 and 2540 spots per inch. Also, in order to accurately simulate lower and higher resolution printers it is desirable to have color proofing printers with adjustable spot densities.

A lens designed for a fixed magnification producing a specific pixel density within a narrow range is disclosed in U.S. Pat. No. 5,258,777. The embodiments in this patent show the complexity of a print lens having image numerical apertures of 0.5 to 0.55 and which incorporate seven to nine elements.

Print lenses have other requirements such as telecentricity on the image side of the lens in order to minimize pixel pitch changes when the image focal distance changes as disclosed in U.S. Pat. No. 5,959,654. A lens telecentric in image space has image chief rays parallel to the optical axis as they exit the lens. A chief ray is the central ray of light within a focussed bundle and would be the only ray left if the aperture stop were to be closed to an infinitesimal opening. In certain cases, such as when a laser is used as the light source, the chief ray is determined by the light source. Another definition of chief ray is that the chief ray is located at the centroid or peak intensity of the image.

It is also sometimes necessary, depending on the light source, to have telecentricity on the object side of the lens. When object sources emit light with their chief rays in a parallel direction, the lens should be designed as a telecentric lens on the object side to avoid light loss for those sources not on the optical axis of the lens and to control off-axis aberrations. The fact that the entrance pupil is at infinity for a telecentric object must be recognized in the correction of off-axis aberrations of the print lens.

A lens which is telecentric in both object and image space must be afocal because collimated light from infinity exits the lens as collimated and does not come to a focus. A common application of afocal lenses is in telescopes where the object and image are effectively an infinite distance away. However, if the object is a finite distance from the lens an afocal optical system will form an image a finite distance from the lens. The use of afocal lenses for objects and images at close or finite distances is less commonly known.

U.S. Pat. No. 5,708,532 discloses a doubly telecentric series of lenses used for measurement at specific magnifications. At a magnification of −1, this lens is symmetric, while at magnifications of −0.5 and −0.25, half the lens is replaced. This is one way to change magnifications, but it is too difficult for a print lens of high resolution clue to sensitivity of the lens position.

It is common practice to use zoom lenses to change magnification. In a zoom lens some lens element groups move and some stay in a fixed position. But in the design of an afocal zoom lens the difference between infinite and finite conjugates must be explicitly recognized because infinite conjugates require only two moving groups while a finite conjugate requires three moving groups. The difference comes with the finite conjugate requirement to hold the object to image distance as the lenses move. This additional constraint imposes the need for the additional degree of motion. Examples of infinite conjugate afocal zoom lenses are disclosed by Abraham in U.S. Pat. No. 5,783,798 and Cobb in U.S. Pat. No. 5,134,523. These are used to relay a laser beam with a diameter. Two other infinite conjugate afocal zoom lenses are disclosed by Minoura in U.S. Pat. No. 4,390,235 and Tokumitsu in U.S. Pat. No. 4,353, 617.These last two are used in printer applications.

Nezu et al., U.S. Pat. No. 4,617,578 discloses a multiple beam zoom lens with an afocal section whose purpose is to adjust the pitch between lasers. This lens is not telecentric on the image side due to the nature of its design, and suffers pitch changes when the focal plane focus position changes, which limits the depth of focus. This approach therefore is less desirable due to the need for tighter manufacturing tolerances. A common error of setting manufacturing tolerances is to allocate some focal depth loss to each error.

Mizutani et al., U.S. Pat. No. 5,805,347, discloses a doubly telecentric lens formed with two positive and one afocal group. This design is overly restrictive in holding the internal group afocal during zoom. This invention discloses only the first order properties of the invention without disclosing the nature of the three groups in any detail leaving the reader unable to evaluate the image quality.

Wakimoto et al., U.S. Pat. No. 4,867,545, discloses telecentric systems with variable magnification. These inventions and their embodiments show either limited performance or are not true zooms. In the first case, the magnification range is small and the telecentricity and focus are not strictly held during zoom, however, the object and image distances are fixed. In the second case, the magnification range is large, but all the three groups move, so neither the object nor image position is fixed with respect to any component of the lens. The third problem with these lenses is that they all use three positive groups and therefore have too much field curvature.

In U.S. Pat. No. 5,414,561, Wakimoto et al. improves on their prior inventions by using a central negative group with the two outer positive groups. This helps to reduce the field curvature. Of the seven embodiments of this patent, only the third embodiment has constant object, image, and overall lens length during zoom. This lens works only at F/8 and is extremely long at over 0.5 meters.

It is therefore desirable to provide a multi-beam zoom lens for producing variable spot sizes in a laser printer. It is also desirable to provide a multi-beam zoom lens which has the capability of varying the pitch of writing spots.

SUMMARY OF THE INVENTION

According to one aspect of the present invention a multi-beam zoom lens for producing variable spot sizes on a photosensitive medium from a plurality of individually modulated light sources wherein each light source emits a light beam parallel to each of the other light sources and parallel to an optical axis and wherein a numerical aperture of each of said light beams is greater than 0.125, comprises an afocal zoom lens. The afocal zoom lens comprises a first moving group of lenses, a second group of moving lenses, and a third group of moving lenses. A constant barrel length of the afocal zoom lens is less than 160 mm and the zoom lens has a constant distance from the light sources to the photosensitive medium of less than 180 mm. The zoom lens has an afocal magnification of at least 45% across a zoom range.

According to one embodiment of the present invention multiple light beams in which the writing spot sizes and pitch can be varied are used. Each beam of light from a plurality of light sources is aimed so that its central axis, or chief ray, is parallel to the optical axis as it enters the lens. By design, the exiting beams have their chief rays also parallel to the optical axis of the lens, making the lens afocal throughout its zoom range. In addition, the lens works with fixed object and image distances while maintaining a fixed length throughout its zoom range. The numerical aperture of this lens is also very high varying from 0.29 to 0.41 (F/1.73 to F/1.21). This is much higher than prior art and makes it suitable for laser thermal printers in which high power is needed to expose the medium. The object to image distance of this system is only about 141 millimeters, much less than prior art.

This invention provides a means to vary the writing pixel size and pitch continuously by at least 50% using a doubly telecentric or afocal zoom lens. It also provides a means to keep the object to image distance and focus of the lens constant throughout the zoom range. The lens of this invention has a constant distance from the object to the first element along with a constant distance from the last lens to the image, and a constant lens length from the first to the last element. This is a significant advantage and allows the change of writing pixel size and pitch of the writing spots in the product without having to make any other adjustments, such as the focal distance, external to the lens.

A lens, according to this invention, also provides means to compensate for rotationally symmetric manufacturing errors in the lens by performing a one-time adjustment of one group's internal position. Improvements in the present invention include: the ability to change pixel size and pitch by at least 50%, telecentricity on both the object and image side of the lens, a fixed lens barrel length, a fixed object and image distance, a high numerical aperture of F/1.7 to F/1.2, a compact length, and compensation means for rotationally symmetric manufacturing errors.

DETAILED DESCRIPTION OF THE INVENTION

Figure 1:
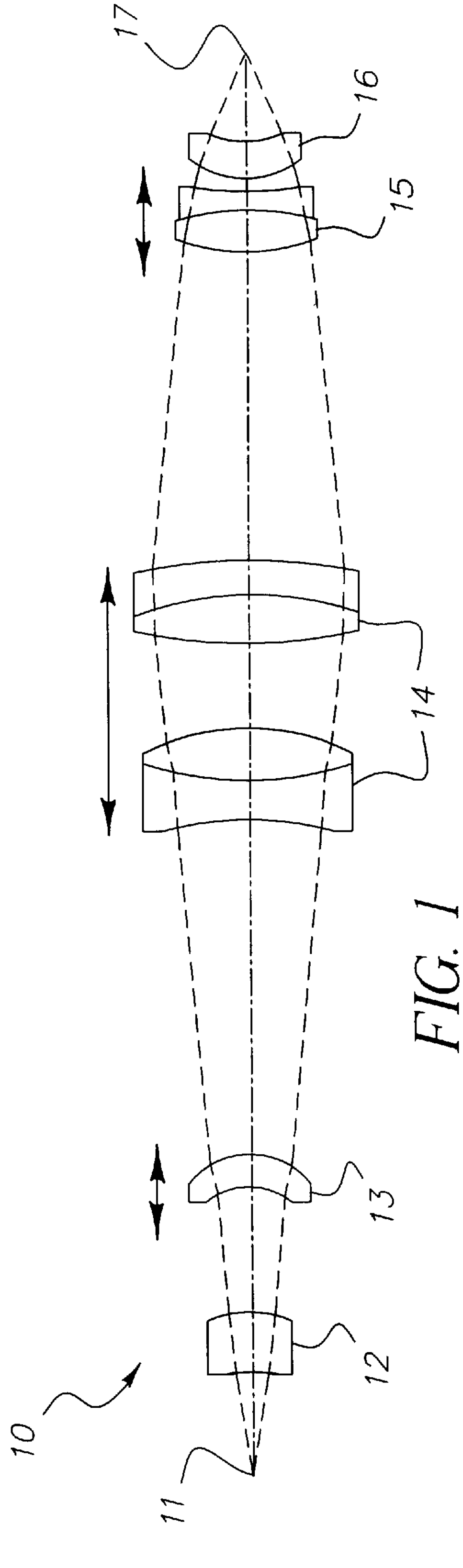
FIG. 1 shows schematic view of a multi-beam zoom lens according to the present invention.

Laser light sources have significant advantages for use in digital printers. They are very bright and have well defined beams acting as single point sources. To improve the writing speed it is advantageous to use multiple lasers, but several problems are introduced when multiple laser beams are used. It is highly desirable to have the writing beams overlap at a distance at which the light intensity is about 50% of peak intensity. If the optical system just images the multiple beams, then the magnification of the spots and their separations change, so the input light beams must be close enough together so that they have significant overlap. This is difficult to achieve, especially when the light sources are very powerful.

One method of solving this problem is to couple each high power laser into an optical fiber and then positions the fibers close together. This is used in U.S. Pat. No. 5,258,777 in which the fibers are aligned parallel to each other. In this case the optical system must be able to handle a source of light in which the chief ray, which is the central ray of each beam along which the maximum power propagates, enters the lens parallel to the optical axis. If this fact is ignored, then the off-axis beams may be completely vignetted and will have aberrations which are completely different from that obtained with a design using a telecentric chief ray.

Optical systems for printers which are telecentric on the image or writing side are advantageous because their magnifications are less sensitive to focal plane positional errors. The optical design of this invention is telecentric in both the object and image space and this makes it afocal too. Any optical system which takes input rays parallel to the optical axis and has them exit the lens parallel to the optical axis is afocal. Normally afocal optical systems find most applications in systems having infinitely distant object and images such as telescopes. Fortunately, afocal systems can work on finite objects and images also.

To have an ordinary afocal zoom lens, only two independent group motions are necessary to meet the two conditions at any zoom position. These conditions are providing a defined magnification and holding the system afocal. If in addition the lens is required to hold the finite object and image distance, a third moving group is need. So, a finite conjugate afocal zoom lens must have three independently zooming groups.

The present invention writes very small pixels making it useful in a very high resolution printer. Small writing spots must have a large numerical aperture creating the beam focus. In fact the numerical aperture is inversely proportional to the writing spot size. Larger numerical apertures are associated with larger aperture dependent aberrations such as spherical aberration and coma. These aberrations also vary during zoom, so such a zoom lens must be designed to control the variation of the aberrations to ensure that the writing spots do not become excessively large and thereby ruin the desired resolution of the printer.

Table 1 below, shows lens design data, for a 830 nanometer wavenlenght for a lens, shown in FIG. 1 according to the present invention. This example has a constant object to image distance of 140.916 mm and a barrel length of 123.151 mm, making it a compact design. Also, the object distance and image distance have fixed values of 10 mm and 7.765 mm respectively.

TABLE 1

| Surface | Radius | Space | Glass |
|---|---|---|---|
| Object | | 10.000 | Air |
| 1 | −16.7700 | 6.000 | SK14 |
| 2 | −11.2600 | 12.606* | Air |
| 3 | −6.0700 | 3.000 | LAK21 |
| 4 | −7.7700 | 33.388* | Air |
| 5 | −37.1400 | 4.000 | SF11 |
| 6 | 31.7600 | 5.000 | SK5 |
| 7 | −25.5560 | 8.601 | Air |
| 8 | 48.5500 | 5.000 | SK5 |
| 9 | −30.7600 | 3.000 | SF11 |
| 10 | −57.4500 | 31.418* | Air |
| 11 | 20.0000 | 4.000 | LAK8 |
| 12 | −22.0900 | 2.000 | SF1 |
| 13 | 53.0300 | 1.026* | Air |
| 14 | 8.9500 | 4.112 | LAK9 |
| 15 | 13.0600 | 7.765 | Air |
| Image | | | |

*adjustable space for zoom

Figure 2A:
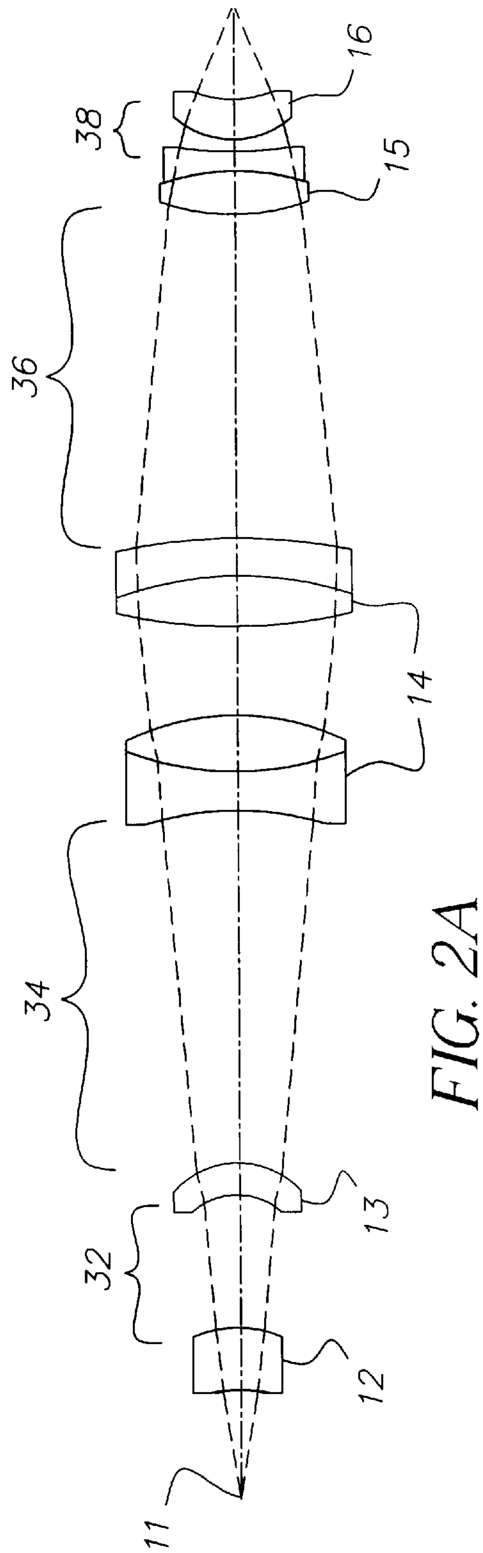
FIG. 2 shows the position of the lens groups of the zoom lens shown in FIG. 1 for three different magnification positions.
Figure 2B:
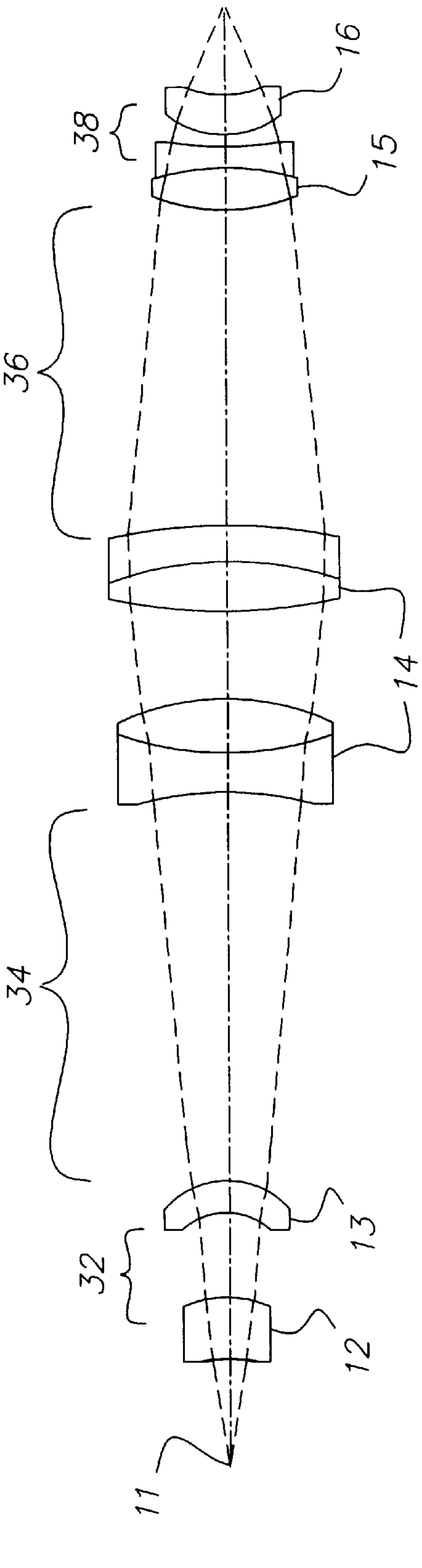
Figure 2C:
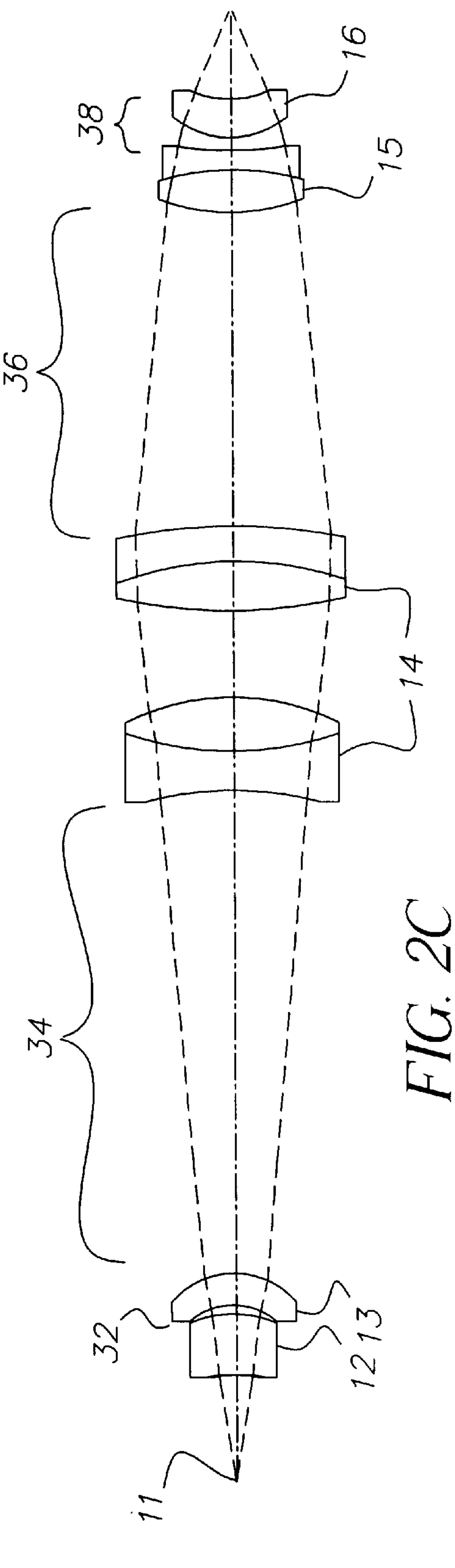

Table 2 gives the zoom spaces for a range of magnifications. FIG. 1 is a schematic of the lens at a magnification of 0.33 along with an upper and lower marginal ray from the object 11 focussing into the image 17. Lenses 12 and 16 are fixed in position while lens 13, group 14 and group 15 zoom to change the magnification. FIGS. 2*a*–2*c* show the positions of the lens groups for three different magnifications. FIG. 2*a*, shows the lens positions at a magnification of 0.3269; FIG. 2*b*, shows the lens positions a FIG. 2*c*, shows the lens positions at a magnification of 0.4846.

TABLE 2

| Magnification | Space 32 | Space 34 | Space 36 | Space 38 |
|---|---|---|---|---|
| 0.3269 | 12.606 | 33.388 | 31.418 | 1.026 |
| 0.3389 | 12.077 | 32.288 | 33.043 | 1.031 |
| 0.3513 | 11.457 | 31.307 | 34.629 | 1.045 |
| 0.3642 | 10.728 | 30.449 | 36.190 | 1.072 |
| 0.3773 | 9.901 | 29.720 | 37.707 | 1.110 |
| 0.3912 | 8.965 | 29.114 | 39.198 | 1.161 |
| 0.4053 | 7.940 | 28.634 | 40.638 | 1.226 |
| 0.4201 | 6.797 | 28.281 | 42.054 | 1.307 |
| 0.4355 | 5.554 | 28.047 | 43.433 | 1.404 |
| 0.4513 | 4.225 | 27.934 | 44.759 | 1.520 |
| 0.4677 | 2.807 | 27.938 | 46.038 | 1.656 |
| 0.4846 | 1.305 | 28.058 | 47.261 | 1.813 |

Figure 3:
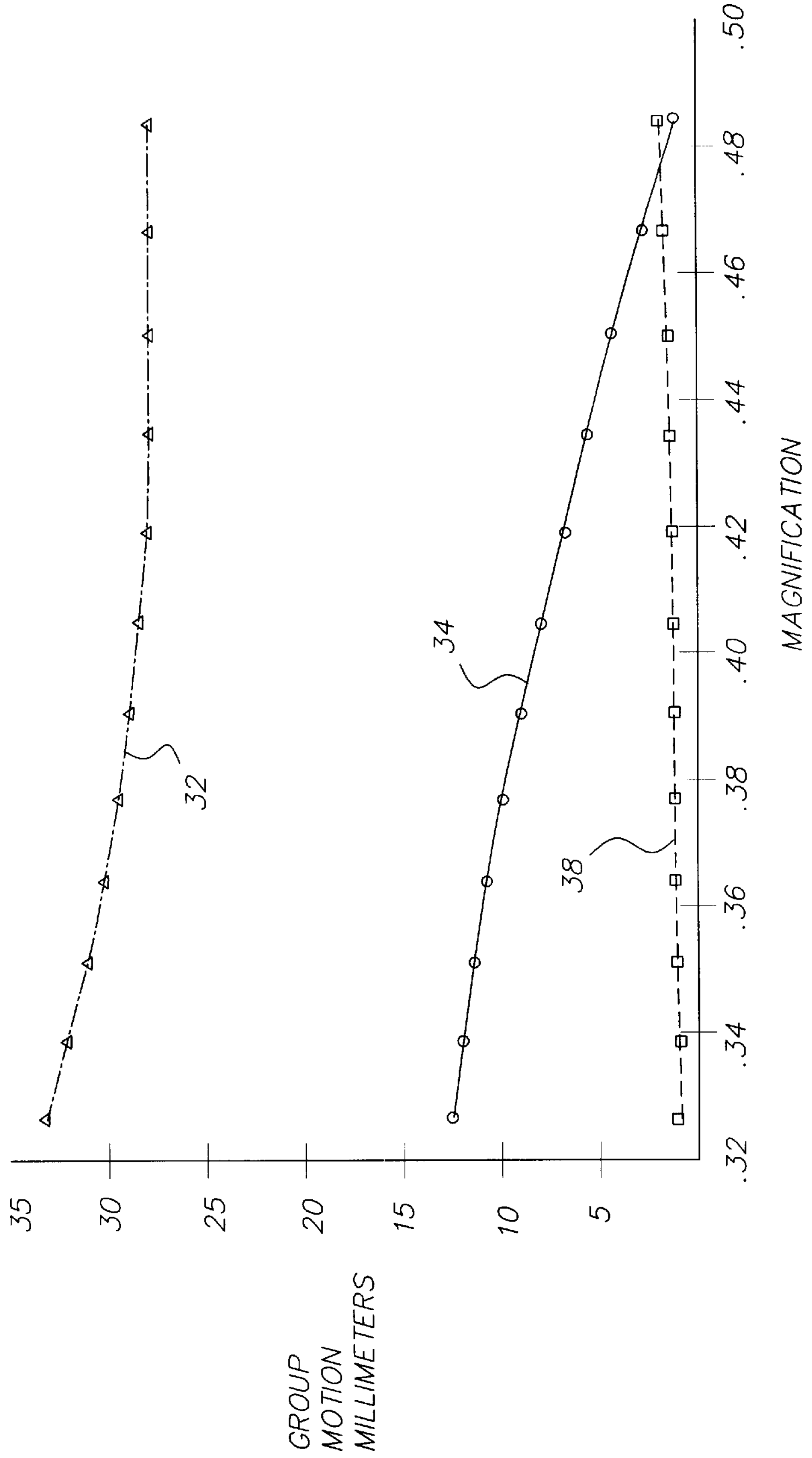
FIG. 3 is a graph of magnification versus motion of the three lens groups shown in FIG. 2.

The motions of the three groups as a function of magnification are illustrated in FIG. 3 with 32 being the curve for the change of space 32; 38 the curve for space 38; and 34 the curve of space 34. It is necessary to show only three spaces because the fourth is constrained by the requirement that the length of the lens is fixed. Spaces 32, 34, 36, and 38 are measured from the center line of each of the curved surfaces respectively, or in other words, from the surface vertex.

An afocal lens can be simply constructed using two lens components separated by the sum of their focal lengths. This invention uses two positive power groups separated by the sum of their focal lengths. The first positive group is comprised of the first fixed lens 12, followed by the next two zooming groups 13 and 14, and the second positive group is comprised of the final zooming doublet 15, followed by the fixed singlet 16. The magnification of such a lens system is equal to the ratio of the focal length of the second group divided by the focal length of the first group. To zoom such a lens in order to vary the magnification, the focal length of either the first or second group or both groups must change and the separation must be adjusted to the sum of the focal lengths in order to hold the afocal condition. In this investigation, the magnification is changed during zoom almost entirely by the focal length of the first group and adjusting the space between components. From one end of the zoom range to the other, the focal length of the first group changes from 55.27 mm to 37.70 mm while the focal length of the second group changes only from 31.26 mm to 29.85 mm.

The compactness s of this zoom lens is enabled by the fact that the principal planes of this first zoom group have large values, especially at the 55.27 mm position. The principal places are the object and image positions of plus one magnification and these planes are used as reference points for measuring distances in thin lens formulas. In other words, in a thick lens, one can use the formulas for thin lenses if distances to the right of the lens are measured from the second principal plane and distances to the left are measured from the first principal plane. For the purposes of discussing an afocal lens made up of two thick or compound lenses, the optical space between them, as opposed to the physical space between glass vertices, is the space between the group's principal planes. At the 55.27 mm focal length position, the first principal plane is nearly 80 mm to the right of surface 1 and the second principal plane is located 42.2 mm to the left of surface 10. The first group comprising the afocal system includes surfaces 1 to 10, or lenses 12, 13 and 14 of FIG. 1.

The advantage of having the second principal plane of the first group 42.4 mm to the left is that the separation of the groups affecting the focal lengths is much larger than the physical space between glass elements, enabling the benefit of the increased optical space without having the physical space itself increase. If the principal plane were instead 42.4 mm to the right of the first group, the physical space would be much larger than needed to achieve the same optical performance.

The focal point of the first group is 12.89 mm to the right of group 14 at 0.3269 magnification position. With this group having a focal length of 55.27, we gain 42.4 mm of physical space reduction by having the second principal plane that much inside the group. Also, since the first principal plane is almost 80 mm to the right of this first group, the effective object distance is increased from 10 mm to nearly 90 mm further benefiting the design. At the 0.4846 magnification end of the zoom range, the second principal plane of the first zoom group is only 8.66 mm to the left of surface 10 and the focal length is 37.7 mm. It can be shown also that the adjustment of the space between the two afocal groups is determined almost entirely by the back focus change of the first afocal group. In other words, the change in value of surface 10 space (space 36 of Table 2) is set by the change of the focal point in the first group during zoom. The primary function of the small change of the focal length and zoom surface space 13 (space 38 of Table 2) of the second group comprising the afocal zoom is to keep the image in the same focal plane during zoom.

The second element, surfaces 3 and 4 of Table 1 forming the first zooming subgroup, is the source of the first afocal group's large negative principal plane position. This element, strongly negative meniscus, has its second principal plane 26.5 mm to the left and its thickness divided by its first radius makes it a large contributor to the principal plane distance. The change in position of this principal plane with respect to tie first fixed group contributes to a changing second principal plane of the combination of the first fixed lens and second moving lens which in turn enhances the principal plane shift of the overall group consisting of the first fixed element and the next zooming subgroups.

Figure 4:
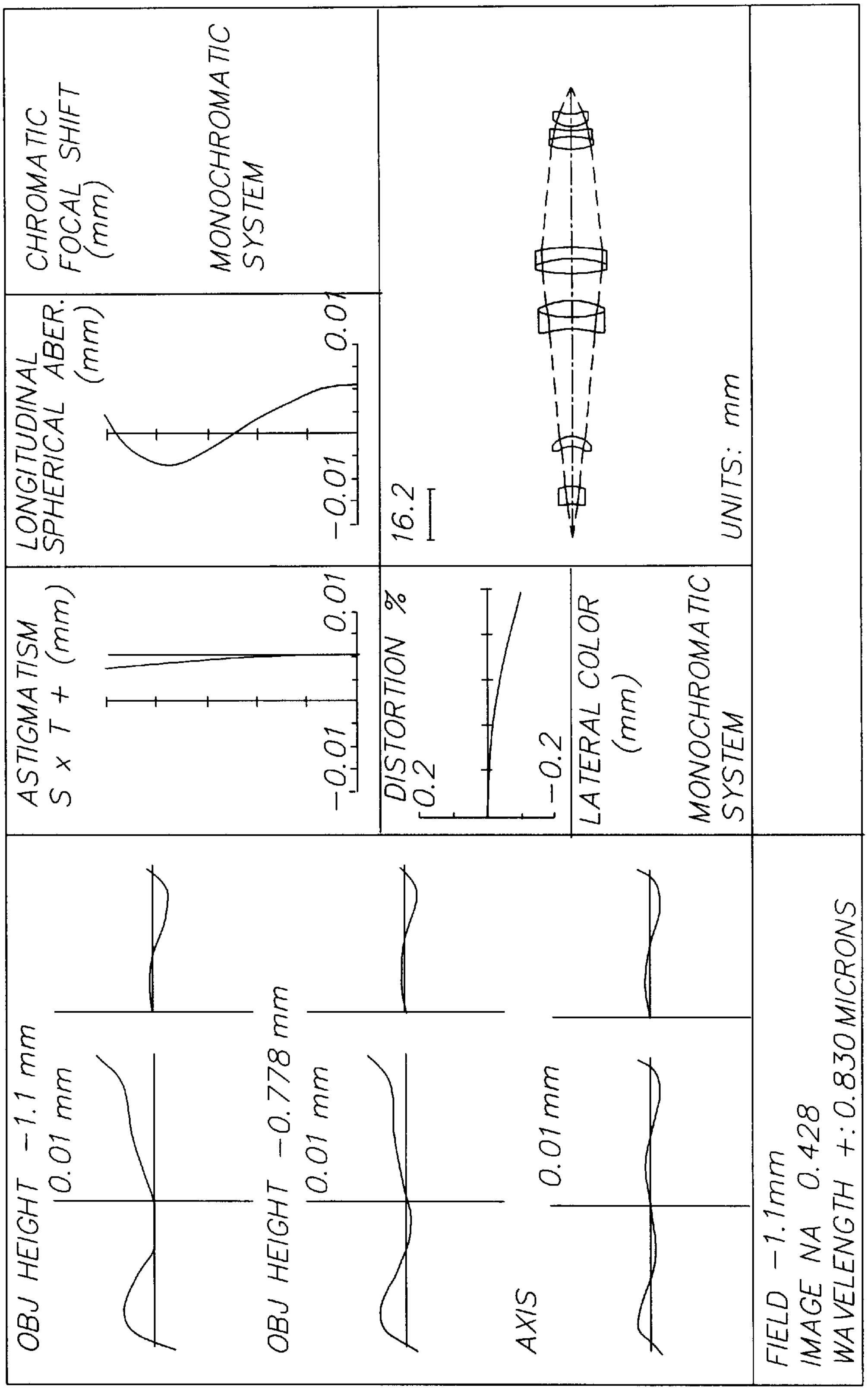
FIG. 4 shows ray aberration performance for a magnification of 0.3269.
Figure 5:
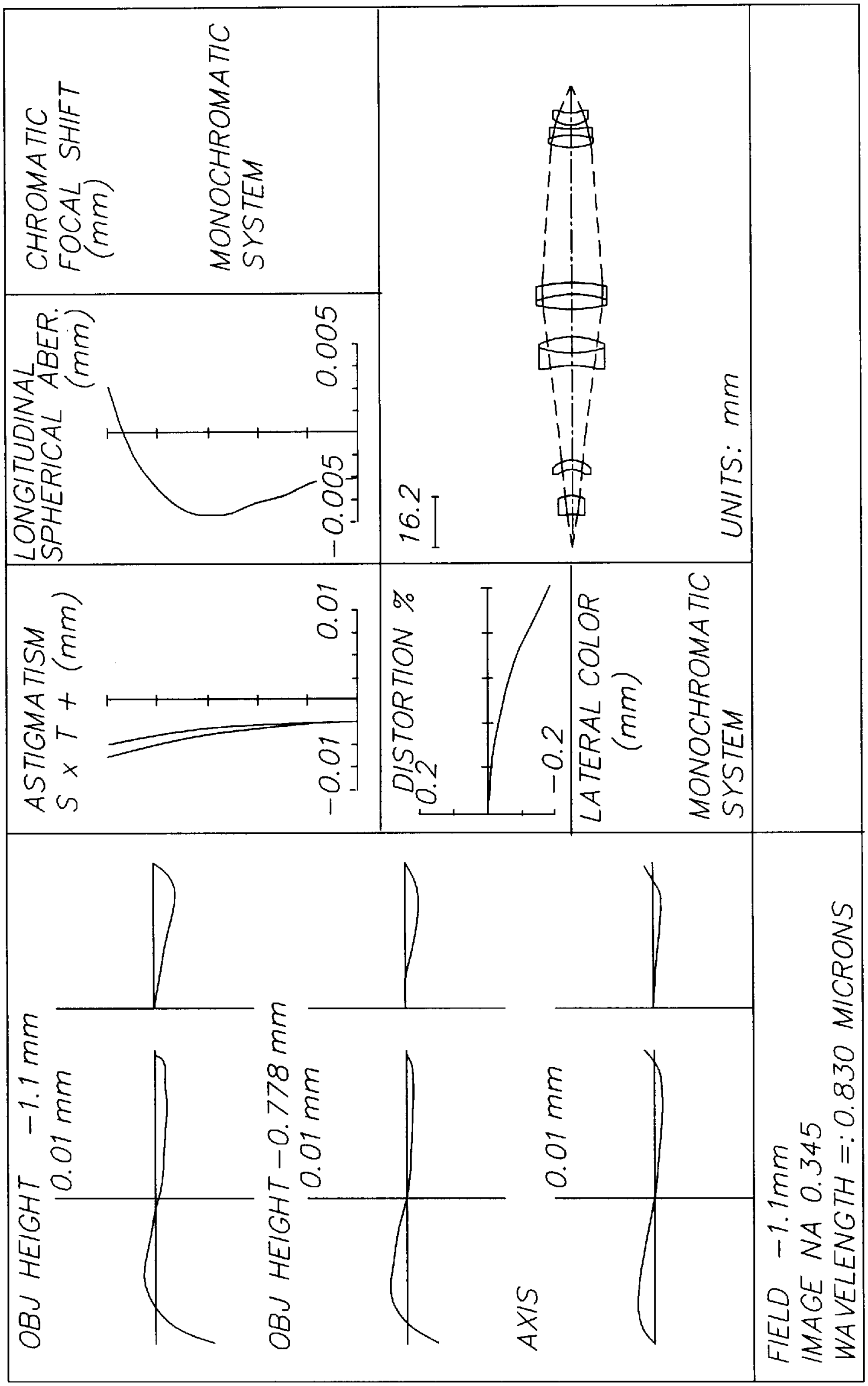
FIG. 5 shows ray aberration performance for a magnification of 0.4053.
Figure 6:
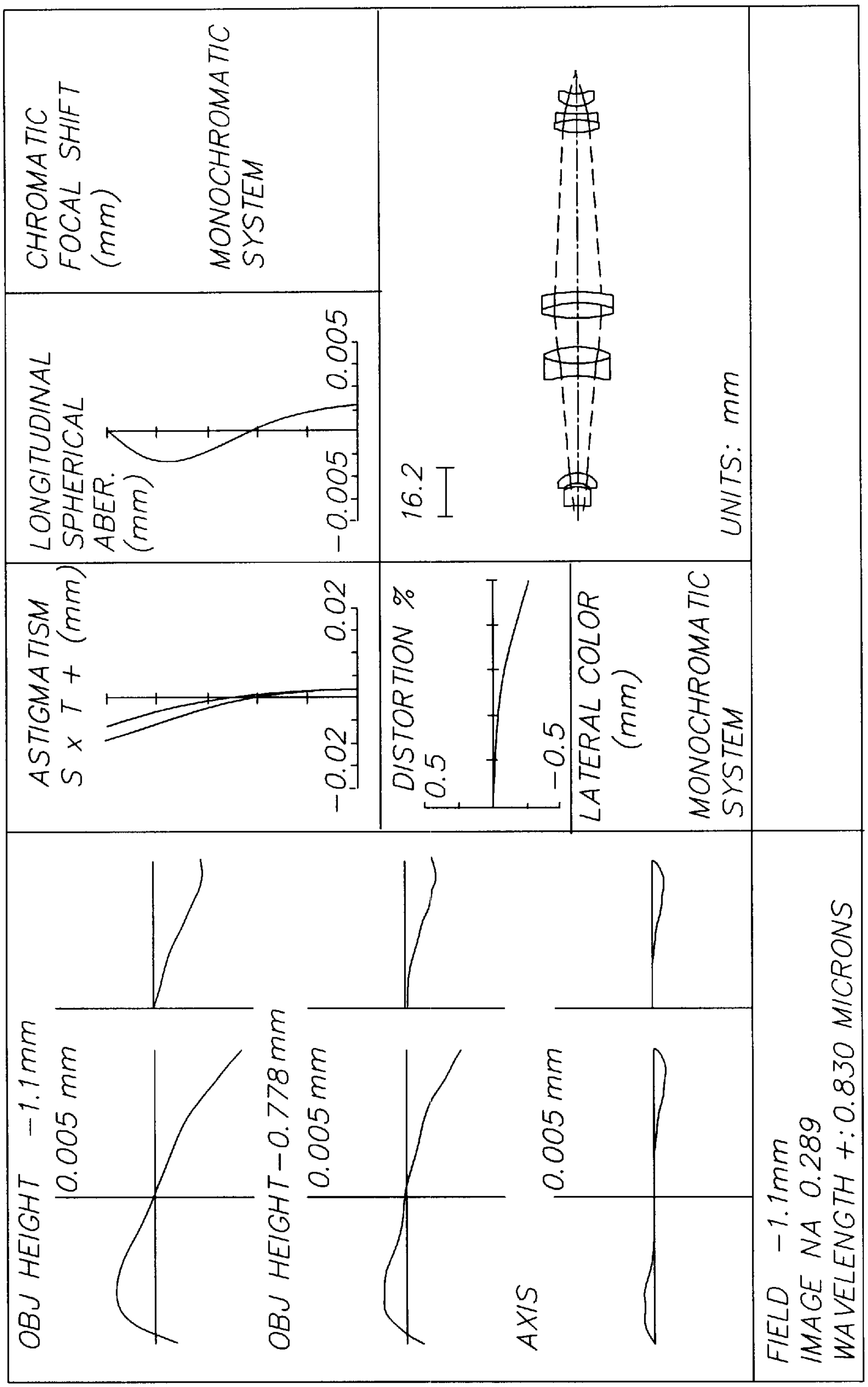
FIG. 6 shows ray aberration performance for a magnification of 0.4846.

The lens ray aberration performance is illustrated in FIGS. 4, 5 and 6 for magnifications of 0.3269, 0.4053, and 0.4846 respectively. It can be seen that most of the transverse ray errors are within a circle of 5 micron radius providing very good performance. The reduced image of a 50 micron core diameter fiber of will range from just over 16 microns to 24 microns. The lens covers a total object field diagonal of 2.2 mm, more than sufficient to image eight such fibers on a pitch of 0.2 mm. Departure from telecentricity is less than 4 seconds of arc throughout the zoom range and paraxial focus is held to less than 6 microns of error as well.

Another aspect of this invention is the fact that it has a natural compensator for rotationally symmetric perturbations. This feature permits significantly looser manufacturing tolerances. The compensation method is a one-time adjustment of the position of zooming doublet, lens group 15, of FIG. 1 within its cam. A change of axial position of this doublet affects a focal shift with very small effects on any other aspect of the lens parameters. Since rotationally symmetric perturbations largely cause focal shifts only, this adjustment can be used as a compensator for manufacturing errors of this type. This design has the characteristic that a fixed axial shift in this doublet position within its zoom motion gives nearly the same focal shift across the zoom range.

This can be understood in detail as follows. First, the chief rays have very small heights as they pass through the final doublet and singlet. The chief ray angles are approaching telecentric by the time they are entering the final singlet too. This means that axial shifts of these components have almost no effect on off-axis aberrations.

A second characteristic of this design is that the final zooming doublet, lens group 15, hardly changes position throughout the zoom range. This means that a small axial offset in position of this doublet, in other words adding or subtracting a small number from the zoom space, will have only small effects on axial spherical. So changes in aberration due to small axial shifts of this doublet have almost no effect on aberration changes.

Third, the magnification changes due to small axial shifts in this doublet are also small. There is a small change in telecentricity of the chief rays due to axial shifts of the doublet, but the exiting chief ray angles remain small due to the small change in chief ray heights and angles.

The net result of an axial shift of the zooming doublet, lens group 15, is then a focal shift. It is advantageous that the focal shift amount is substantially one fourth the amount of the zooming doublet motion, but in the opposite direction. For example, if the zooming doublet motion is 0.2 mm, the focal shift is −0.051 mm. The fact that the focal shift amount is about one fourth of the zooming doublet motion, provides a mechanical advantage to use this adjustment to fine tune the compensation of rotationally symmetric errors. By using this compensator, larger rotationally manufacturing errors can be allowed, thus potentially reducing cost.

Figure 7:
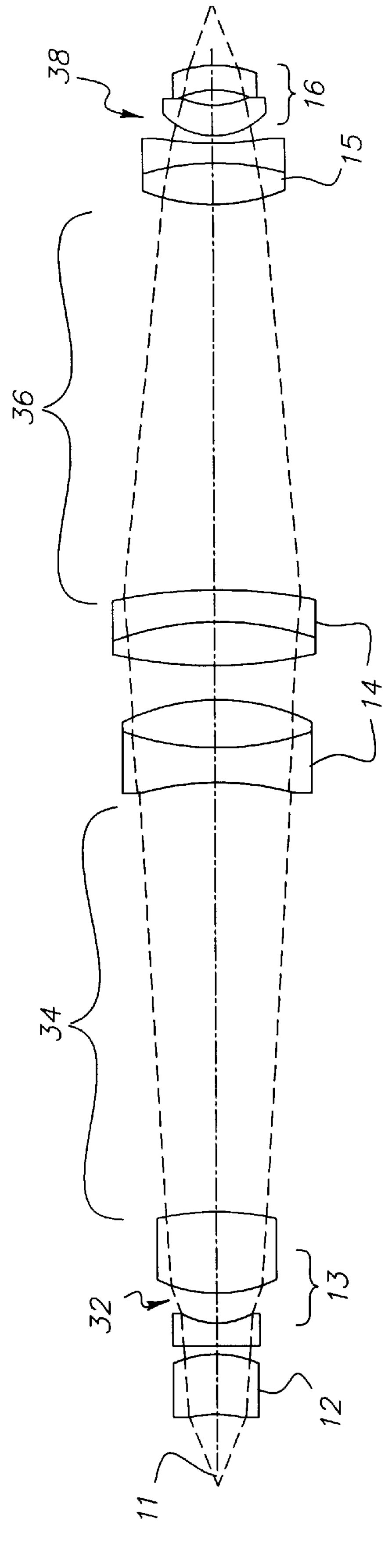
FIG. 7 shows a schematic view of an alternate embodiment of a multi-beam zoom lens according to the present invention.

A second embodiment is shown in FIG. 7 with the table below listing the lens design data. This embodiment covers a total field of 4 mm and has two additional elements. The first additional element is in the first zooming group which consists of two air-spaced singlets instead of one singlet in the first embodiment. The second additional element is in the fixed rear group which consists of two air-spaced singlets in place of one in the first embodiment. These two elements are needed to reduce off-axis aberrations of astigmatism and coma.

Figure 8:
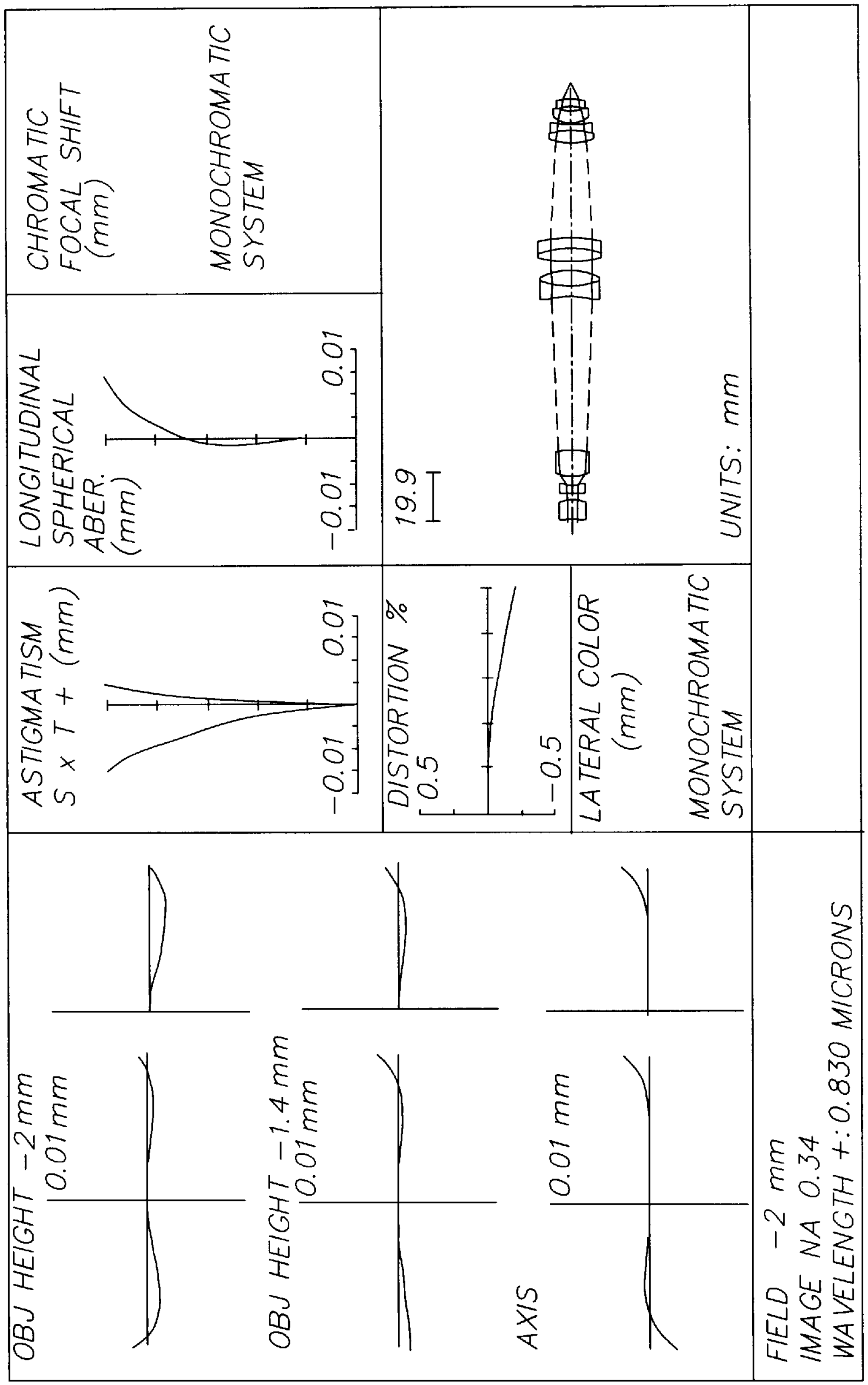
FIG. 8 shows ray aberration performance for a magnification of 0.412.
Figure 9:
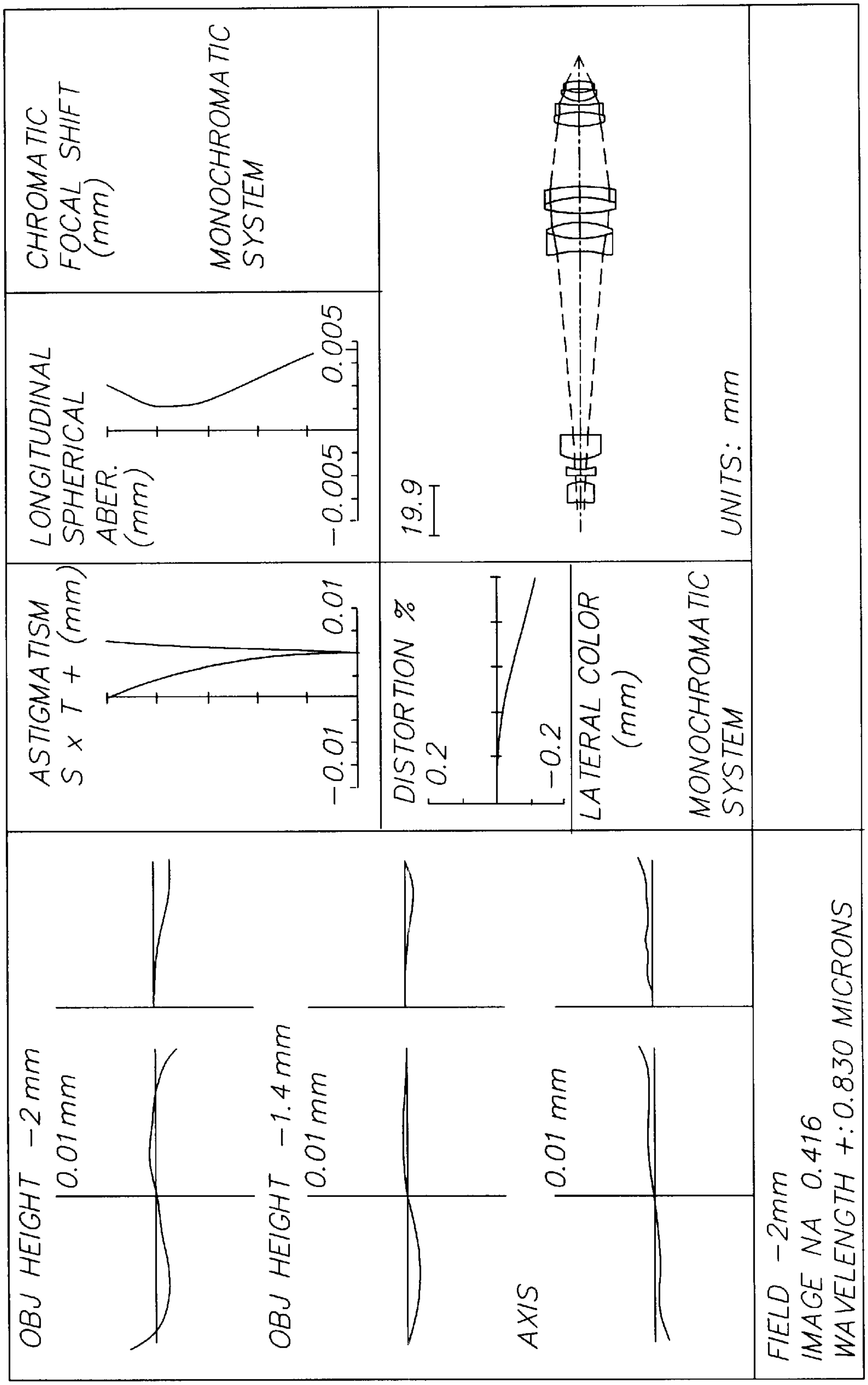
FIG. 9 shows ray aberration performance for a magnification of 0.337.
Figure 10:
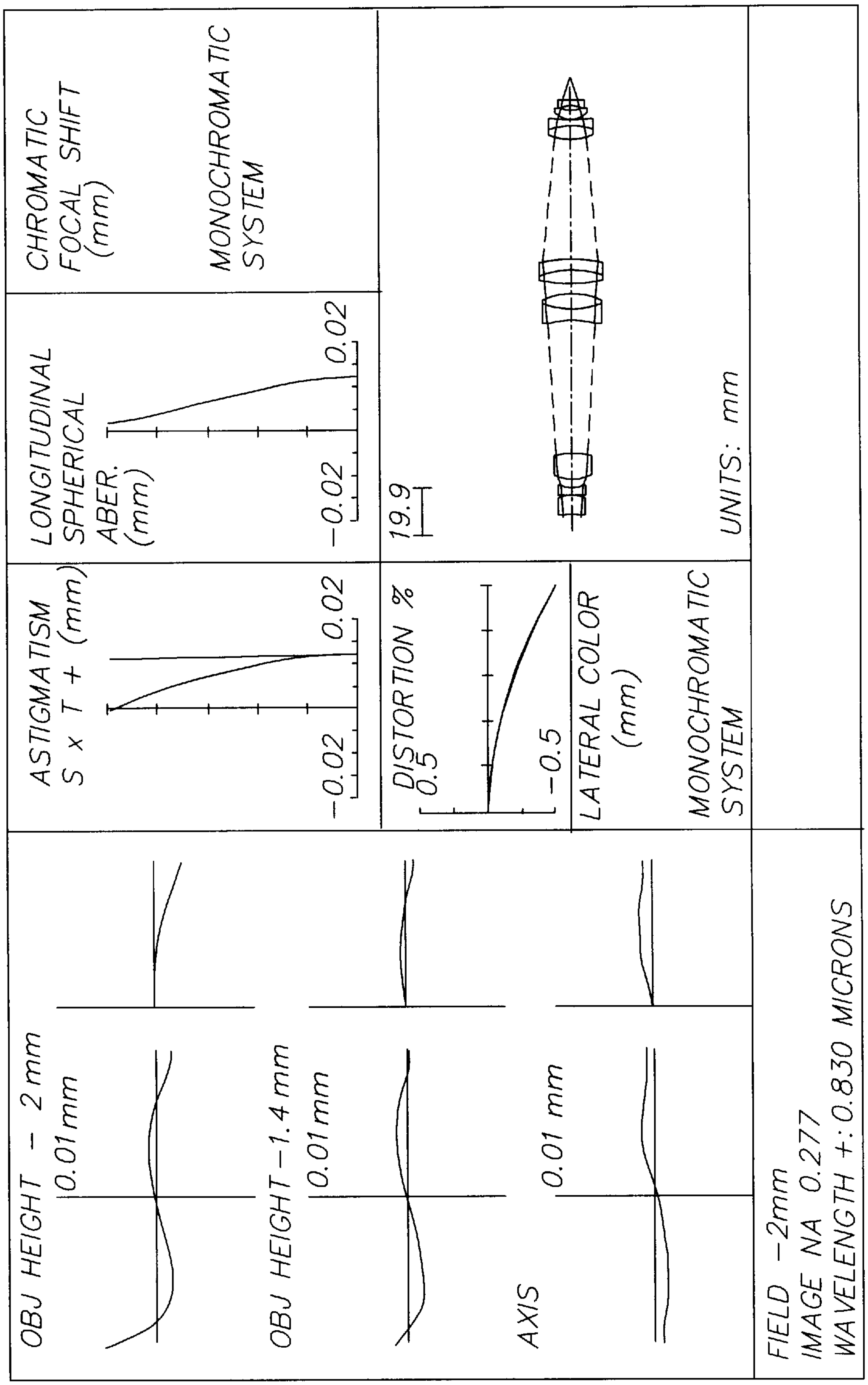
FIG. 10 shows ray aberration performance for a magnification of 0.505.

The second embodiment has a barrel length of 153.393 mm and an object to image distance of 170.988 mm. It maintains the same object distance of 10 mm as the first embodiment with a somewhat smaller back focus of 7.595 mm. Table 3 lists the lens design data for each surface of this embodiment. Table 4 gives the zoom space values for magnifications at each end of the zoom range and one in the middle of the zoom range. Performance of this embodiment is very similar to the first embodiment as can be seen from the ray aberration curves shown for three magnifications in FIGS. 8, 9 and 10.

TABLE 3

| Surface | Radius | Space | Glass |
|---|---|---|---|
| Object | | 10.000 | Air |
| 1 | −17.7404 | 6.000 | SK14 |
| 2 | −10.9065 | 2.6246* | Air |
| 3 | −75.5384 | 2.4 | SSKN8 |
| 4 | 11.5082 | 3.8949 | Air |
| 5 | 19.4563 | 9.3563 | BAF4 |
| 6 | −50.7260 | 57.407* | Air |
| 7 | −64.6583 | 4.000 | SF11 |
| 8 | 37.8191 | 5.000 | SK14 |
| 9 | −42.2258 | 5.0245 | Air |
| 10 | 62.8564 | 5.000 | SK5 |
| 11 | −25.7444 | 3.000 | SF8 |
| 12 | −52.1005 | 35.350* | Air |
| 13 | 17.5831 | 4.929 | LAK8 |
| 14 | −22.7658 | 2.000 | SF1 |
| 15 | 31.5947 | 1.008* | Air |
| 16 | 9.0372 | 2.4 | SF11 |
| 17 | 10.0474 | 1.598 | Air |
| 18 | −38.9000 | 2.4 | LaK8 |
| 19 | −32.2507 | 7.595 | Air |
| Image | | | |

*adjustable space for zoom

TABLE 4

| Magnification | Space32 | Space 34 | Space 36 | Space 38 |
|---|---|---|---|---|
| 0.337 | 3.050 | 71.911 | 23.240 | 2.215 |
| .412 | 2.625 | 61.432 | 35.350 | 1.008 |
| .505 | .108 | 54.216 | 46.024 | .066 |

The invention has been described in detail with particular reference to certain preferred embodiments thereof, but it will be understood that variations and modifications can be effected within the scope of the invention.

PARTS LIST

10. Afocal zoom lens
11. Object
12. Lens
13. First lens
14. Second lens group
15. Third lens group
16. Lens
17. Image
32. Space
34. Space
36. Space
38. Space

What is claimed is:

1. A multi-beam zoom lens for producing variable spot sizes on a photosensitive medium from a plurality of individually modulated light sources, wherein each light source emits a light beam parallel to each of said other light beams and also parallel to an optical axis, wherein a numerical aperture of each of said light beams is greater than 0.125, comprising:

an afocal zoom lens comprising a first moving group of lenses, a second group of moving lenses, and a third group of moving lenses;

wherein a constant barrel length of said afocal zoom lens is less than 160 mm;

wherein said zoom lens has a first constant distance from said light sources to said photosensitive medium of less than 180 mm; and wherein said zoom lens has an afocal magnification change of at least 45% across a zoom range.

2. A multi-beam zoom lens as in claim 1 wherein said zoom lens consists of a first negative optical power group, a second positive optical power group, and a final positive optical power group.

3. A multi-beam zoom lens as in claim 2 in which said zoom lens has a compensator for rotationally symmetric manufacturing errors, said compensator having an axial position offset adjustment for a final zooming group, wherein said adjustment is done once at manufacturing.

4. A multi-beam zoom lens as in claim 2 wherein a distance from said light sources to a first lens surface is constant.

5. A multi-beam zoom lens as in claim 2 wherein a distance from a last lens surface to said photosensitive medium is constant.

6. A multi-beam zoom lens as in claim 1 wherein said spot sizes are between 10 and 30 microns as measured at a full width of a half peak intensity.

7. A multi-beam zoom lens as in claim 6 wherein a wavelength of each of said light sources is between 750 and 850 microns.

8. A multi-beam zoom lens as in claim 6 wherein said light sources are arranged in a two dimensional grid which fits within a circle of 2.0 mm radius and operate simultaneously.

9. An optical system for exposing multiple image pixels on a medium using individually modulated light sources wherein each light source emits a light beam parallel to the each of said other light beams and an optical axis of said optical system, wherein a numerical aperture of each light beam is greater than or equal to 0.125 or F-number smaller than F/4.2, comprising:

an optical subsystem comprising an afocal zoom lens with three or more independently internal moving groups;

said optical subsystem having a constant barrel length of less than 125 millimeters;

said optical subsystem having a constant distance from said light sources to said medium of less than 150 millimeters; and wherein said zoom lens has an afocal magnification change of at least 45% across a zoom range.

10. An optical system as in claim 9 wherein said zoom lens consists of a first negative optical power group, a second positive optical power group, and a final positive optical power group.

11. An optical system as in claim 10 wherein said zoom lens has a compensator for rotationally symmetric manufacturing errors, said compensator having an axial position offset adjustment for a final zooming group, wherein said adjustment is done once at manufacturing.

12. An optical system as in claim 10 wherein a distance from said light sources to a first lens surface is constant.

13. An optical system as in claim 10 wherein a distance from a last lens surface to said medium is constant.

14. An optical system as in claim 9 wherein said image pixels are between 10 and 30 microns as measured at a full width of a half peak intensity.

15. An optical system as in claim 14 wherein wavelengths of each of said light sources is between 750 and 850 microns.

16. An optical system as in claim 14 wherein said light sources are arranged in a two dimensional grid which fits within a circle of 2.0 mm radius and operate simultaneously.

17. A printer for producing variable spot sizes on a media comprising:

a plurality of light sources wherein each of said light sources emits a light beam parallel to each of said other light beams and parallel to an optical axis;

wherein a numerical aperture of each of said light beams is greater than 0.125;

an afocal zoom lens comprising a first moving group of lenses, a second moving group of lenses, and a third moving group of lenses;

wherein a constant barrel length of said afocal zoom lens is less than 160 mm;

wherein said zoom lens has a first constant distance from said light sources to said medium of less than 180 mm; and wherein said zoom lens has an afocal magnification change of at least 45% across a zoom range.

* * * * *